(12) United States Patent
Blenc et al.

(10) Patent No.: US 10,215,114 B2
(45) Date of Patent: Feb. 26, 2019

(54) METHOD AND SYSTEM FOR VEHICLE PROPULSION SYSTEM CONTROL

(71) Applicant: GM GLOBAL TECHNOLOGY OPERATIONS LLC, Detroit, MI (US)

(72) Inventors: Dalton A Blenc, Clarkston, MI (US); Aaron Bowles, Howell, MI (US)

( * ) Notice: Subject to any disclaimer, the term of this patent is extended or adjusted under 35 U.S.C. 154(b) by 155 days.

(21) Appl. No.: 15/446,030

(22) Filed: Mar. 1, 2017

(65) Prior Publication Data

US 2018/0252172 A1 Sep. 6, 2018

(51) Int. Cl.
| | | |
|---|---|---|
| *F02B 33/44* | (2006.01) |
| *F02D 41/00* | (2006.01) |
| *F01L 1/04* | (2006.01) |
| *F01N 13/10* | (2010.01) |
| *F02B 37/11* | (2006.01) |
| *F02D 41/06* | (2006.01) |
| *F02M 35/10* | (2006.01) |
| *F02M 35/104* | (2006.01) |
| *F02N 11/04* | (2006.01) |
| *F02N 11/08* | (2006.01) |

(52) U.S. Cl.
CPC ............ *F02D 41/0007* (2013.01); *F01L 1/04* (2013.01); *F01N 13/10* (2013.01); *F02B 37/11* (2013.01); *F02D 41/062* (2013.01); *F02M 35/104* (2013.01); *F02M 35/10157* (2013.01); *F02N 11/04* (2013.01); *F02D 2041/001* (2013.01); *F02N 11/0814* (2013.01); *Y02T 10/144* (2013.01)

(58) Field of Classification Search
CPC ................... F02B 37/10; F02B 39/10
USPC .......................................................... 60/608
See application file for complete search history.

(56) References Cited

U.S. PATENT DOCUMENTS

| | | | |
|---|---|---|---|
| 4,901,530 A | 2/1990 | Kawamura | |
| 5,906,098 A | 5/1999 | Woollenweber et al. | |
| 6,032,466 A | 3/2000 | Woollenweber et al. | |
| 6,256,993 B1 | 7/2001 | Halimi et al. | |
| 6,705,259 B1* | 3/2004 | Sellnau ................. | F01L 1/08 123/90.16 |
| 7,805,939 B2 | 10/2010 | Kimoto | |
| 7,827,790 B2 | 11/2010 | Kimoto | |
| 8,371,121 B2 | 2/2013 | Goedeke et al. | |
| 8,958,971 B2 | 2/2015 | Hofbauer | |
| 2011/0107739 A1* | 5/2011 | Shimizu ............... | F01N 3/2006 60/273 |

(Continued)

FOREIGN PATENT DOCUMENTS

JP WO 2016111034 A1 * 7/2016 ............. B63H 21/14

*Primary Examiner* — Ngoc T Nguyen

(57) ABSTRACT

A vehicle propulsion system includes an internal combustion engine with a cylinder, an intake valve, an exhaust valve, and a cylinder head defining a combustion chamber; an intake manifold in communication with the combustion chamber through the intake valve; an exhaust manifold in communication with the combustion chamber through the exhaust valve; a turbocharger with a compressor in communication with the intake manifold, a turbine in communication with the exhaust manifold, and an electric motor for selectively driving the turbine; and a controller in communication with the electric motor and configured to selectively operate electric motor to drive the turbine to reduce a pressure in the combustion chamber during an engine start process.

7 Claims, 5 Drawing Sheets

(56) References Cited

U.S. PATENT DOCUMENTS

2016/0047298 A1\* 2/2016 Lofgren .................. F02B 37/14
                                                    60/273
2017/0363024 A1\* 12/2017 Sivaraman .............. F02B 37/10
2018/0001984 A1\* 1/2018 Yamashita ............. B63H 21/14

\* cited by examiner

METHOD AND SYSTEM FOR VEHICLE PROPULSION SYSTEM CONTROL

FIELD

The present disclosure relates to a method and system for vehicle propulsion system control.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Currently, many vehicles on the road include an engine start/stop system which automatically shuts down and restarts the engine. This reduces the idling time of the engine which reduces fuel consumption and emissions. Starting the engine requires a transition from a completely stationary condition to a condition in which the crankshaft is rotating, the pistons are reciprocating within their respective cylinders, and many other components are also moving before fuel and spark can be introduced. The transition from the stopped condition to an operating condition requires a certain amount of energy. It is desirable to minimize the amount of energy consumed by this engine start process.

Further, this transition may also result in undesirable vibrations being generated, transmitted into the chassis of the vehicle, and felt by the occupants of the vehicle. It is preferable to minimize these vibrations. While occupants of automobiles have generally become accustomed to feeling a vibration when the engine first starts, thereby letting the occupants have the confidence and knowledge that the engine has started and is ready to travel, during a journey, the repeated starting resulting from an auto stop/start system may result in undesirable vibrations being felt by the occupants. It is desirable to reduce and minimize these vibrations.

SUMMARY

In an exemplary aspect, a vehicle propulsion system includes an internal combustion engine with a cylinder, an intake valve, an exhaust valve, and a cylinder head defining a combustion chamber; an intake manifold in communication with the combustion chamber through the intake valve; an exhaust manifold in communication with the combustion chamber through the exhaust valve; a turbocharger with a compressor in communication with the intake manifold, a turbine in communication with the exhaust manifold, and an electric motor for selectively driving the turbine; and a controller in communication with the electric motor and configured to selectively operate electric motor to drive the turbine to reduce a pressure in the combustion chamber during an engine start process.

In another exemplary aspect, the controller is further configured to close the intake valve.

In another exemplary aspect, the controller is further configured to open the exhaust valve.

In another exemplary aspect, the controller is configured to operate the electric motor for a predetermined period of time.

In another exemplary aspect, the controller is configured to operate the electric motor for a predetermined period of time before a force is applied to initiate motion of a piston in the engine.

In another exemplary aspect, the system further includes a belt alternator/starter system that applies the force that initiates motion of a piston in the engine.

In another exemplary aspect, the controller is configured to operate the electric motor for a predetermined period of time before a fuel is supplied to the combustion chamber.

In another exemplary aspect, the controller is configured to operate the electric motor for a predetermined period of time before a spark is introduced into the combustion chamber.

In another exemplary aspect, the system further includes a two-step cam controlling one of the intake valve and the exhaust valve.

In this manner, the energy required to start the engine may be reduced, the amount of vibration generated by the engine during a start process is reduce, which improves the driver experience, and the amount of time required to start the engine may be reduced.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
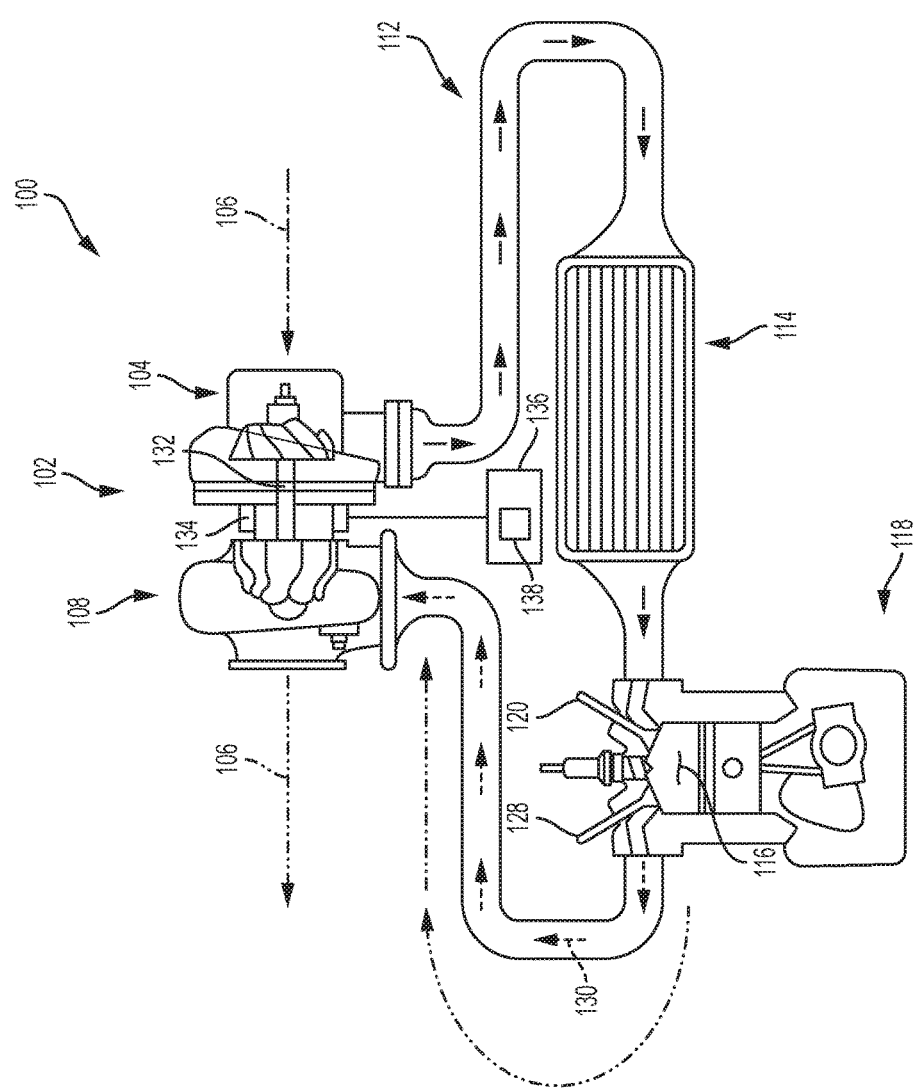
FIG. 1 is a schematic illustration of a portion of components of a vehicle propulsion system 100.

FIG. 1 is a schematic illustration of a portion of components of a vehicle propulsion system 100. The system includes a turbocharger 102 that includes a compressor 104 on an intake side 106, a turbine 108 on an exhaust side 110, and an electric motor/generator 134 for selectively driving the turbocharger 102. When operating, the compressor 104 increases the pressure of the air being fed into the engine through an intake manifold 112. Optionally, the intake 112 may include an intercooler 114 which reduces the temperature of the air flowing through the intake manifold 112. The flow of intake air from the intake manifold 112 into a combustion chamber 116 the engine 118 is selectively controlled by an intake valve 120 and a throttle valve (not shown) in the intake manifold.

Figure 2:
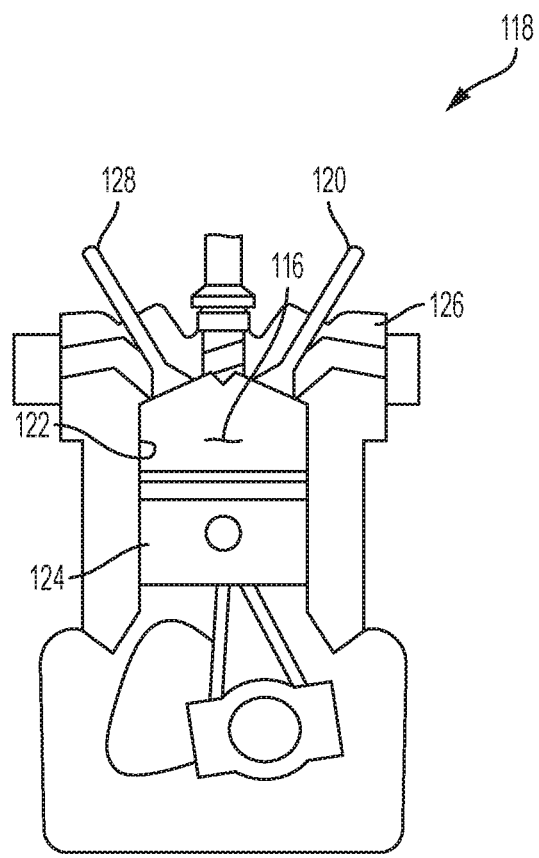
FIG. 2 is an enlarged schematic illustration of an engine 118 of the system 100.

Referring now to FIG. 2, the combustion chamber 116 has a volume which is defined by cylinder walls 122, a piston 124, cylinder head 126, intake valve 120, and an exhaust valve 128. During operation, the piston 124 reciprocates within the cylinder and changes the volume of the combustion chamber 116. The pressure within the combustion chamber 116 varies according to the position of the piston 124 and the configuration of the intake valve 120 and exhaust valve 128. In an engine that operates as a four-stroke engine, the piston 124 will compress the contents of the combustion chamber 116 when both the intake valve 120 and the exhaust valve 128 are closed during a portion of the four-stroke cycle. This compression requires significant amount of energy to force the piston 124 upwards against the contents of the combustion chamber 116.

Referring back now to FIG. 1, in another portion of the four-stroke cycle, the exhaust valve 128 opens while the piston 116 rises vertically and the intake valve 120 is closed. This causes the contents of the combustion chamber 116 to flow into an exhaust manifold 130. The exhaust gases flow through the exhaust manifold 130 into the exhaust side of the turbocharger 102 into contact with the turbine 108. Energy from the exhaust gases impacting the turbine 108 is converted into rotation of a turbocharger shaft 132 which, in turn, drives the compressor 104.

The electric motor/generator 134 is in communication with a controller 136 that includes an energy storage device such as, for example, a battery 138. The controller 136 may selectively operate to provide energy from the battery 138 to drive rotation of the turbocharger shaft 132 or to receive energy from the turbocharger shaft 132 and store that energy in the battery 138.

A typical starting system for a vehicle propulsion system relies upon an electric motor. The electric motor may be, for example, a starter motor which may have an output shaft that is geared to a flywheel mounted on an engine crankshaft. Another example may be a belt alternator/starter (also known as a "BAS") which is connected to the crankshaft through a belt. Other examples may include a motor in a transmission unit or elsewhere. In general, any electric motor, which may be high voltage or not, which is capable of applying torque to the engine may be applicable. A belt alternator/starter may selectively be controlled to act as a generator (alternator) which takes energy from the crankshaft, through the belt, and generates electricity that is stored in a battery. The belt alternator/starter may also be selectively controlled to receive energy from the battery and to apply a torque to the crankshaft, through the belt. In this manner, energy from the battery may be used to start the motion of the components within the engine in preparation for the introduction of fuel and spark. In vehicle propulsion systems incorporating auto start/stop systems the repetitive starting may require a more powerful and higher capacity battery and a higher durability and capacity belt alternator/starter system in comparison to vehicle propulsion systems which do not include an auto start/stop system.

Figure 3:
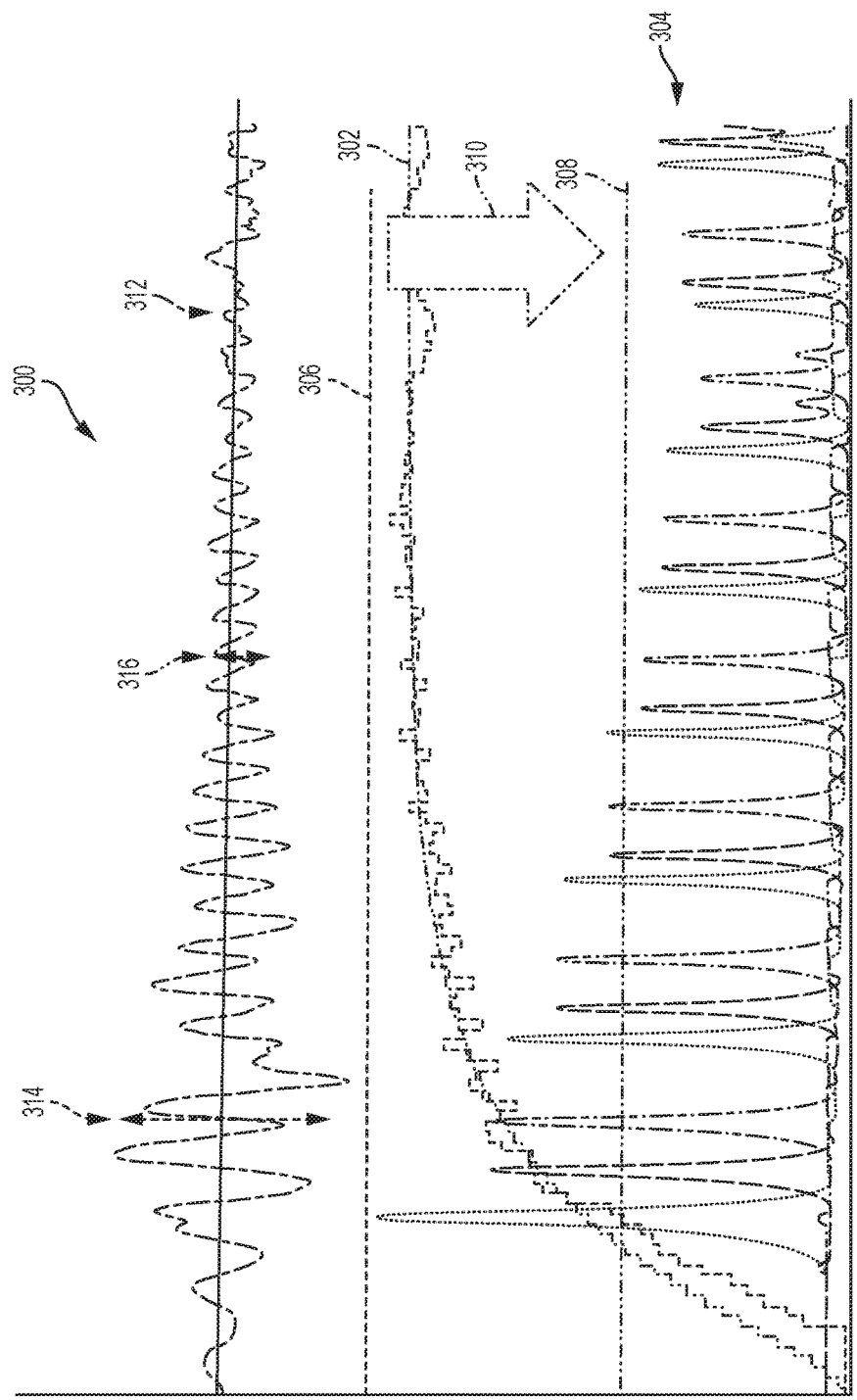
FIG. 3 is a graph 300 illustrating the operation of engine 118 during a start process and prior to the introduction of fuel and spark.

FIG. 3 is a graph 300 illustrating the operation of an engine 118 during a start process and prior to the introduction of fuel and spark. Line 302 illustrates the engine speed (e.g., the rotating speed of the crankshaft). Lines 304 illustrate the pressure within each of a plurality of combustion chambers 116 in the engine 118. In this particular example, the engine 118 includes four combustion chambers 116. As is clearly illustrated by lines 304, the pressures within the combustion chambers pulse and peak highest at an earlier portion of the start process at an amplitude indicated by line 306. Those pressure peaks gradually reduce as the start process continues to a value at or below that approximately indicated by line 308. Thus, there is a large difference 310 between the peak pressure pulse amplitude 306 early in the start process and the pressure peak amplitudes 308 later in the start process.

As mentioned previously, the pressures within the combustion chambers 116 represented by the pressure signal lines 304 directly oppose the motion of the piston 116 when moving to compress the volume in the combustion chambers 116. Thus, the higher the pressures within the combustion chambers, the more energy is required to move the piston 116 and, in turn, increase the engine speed 302 to a value which is sufficient to introduce fuel and spark and initiate operation of the engine. During this start process, the source of the energy to overcome those combustion pressures 304 is provided by the battery through the belt alternator/starter system. The amount of this energy would be reduced if the combustion chamber pressures 304 were reduced.

The graph 300 of FIG. 3 further illustrates a driver seat accelerometer signal 312 that occurs during the engine start process. The driver seat accelerometer signal 312 serves as an indicator of the vibration that might be felt by a driver of the vehicle. It is desirable to reduce this vibration as much as possible to improve the driver experience and, preferable, to reduce the operation to a level which becomes imperceptible to the driver. FIG. 3 clearly illustrates that the accelerometer signal 312 has higher peak amplitudes at an earlier portion 314 of the start process than those at a later portion 316 which correlates with the peak amplitudes of the pressure signals 304.

Figure 4:
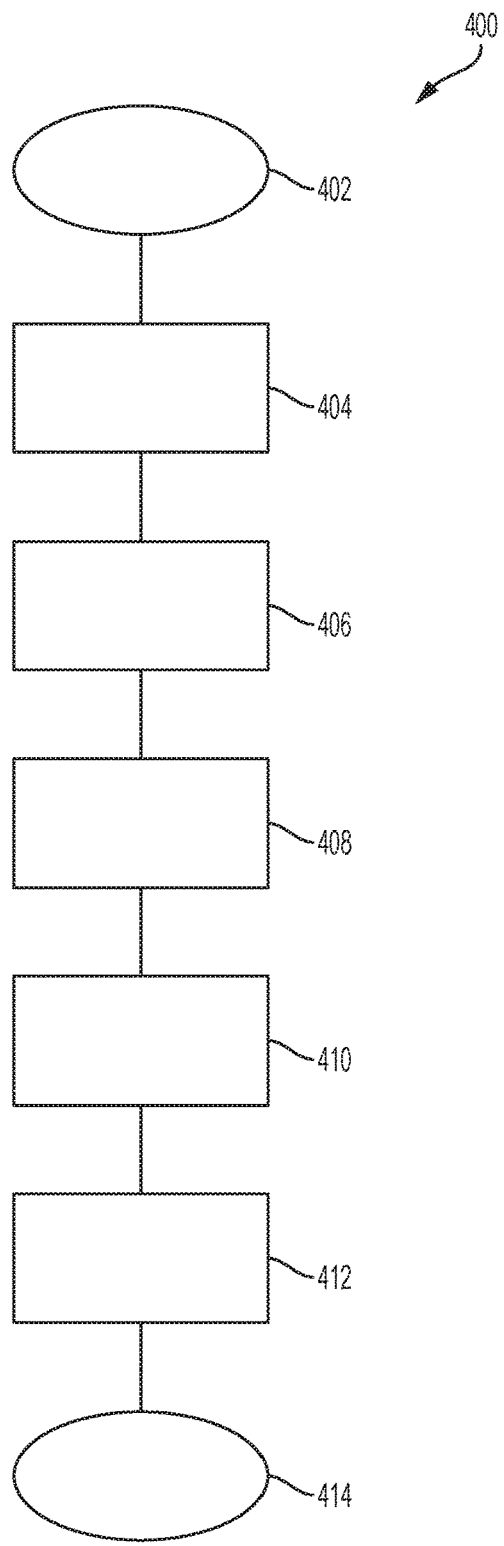
FIG. 4 is a flowchart 400 illustrating an exemplary method in accordance with the present invention.

FIG. 4 is a flowchart 400 illustrating an exemplary method in accordance with the present invention. The method starts at step 402 and continues to step 404. In step 404, the method closes the throttle valve and continues to step 406. In step 406, the method closes the intake valve and continues to step 408. In step 408, the method opens the exhaust valve and continues to step 410. In step 410, the method operates the turbocharger motor 134 to drive the turbine 108. In this configuration, the turbine 108 is driven to reduce the pressure within the exhaust manifold 130 which, in turn, reduces the pressure in the combustion chamber 116. The turbine may have blades which are adapted to reduce the pressure in the exhaust manifold 130. In this manner, the pressure in the combustion chamber 116 that opposes movement of the piston 124 is reduced which, in turn, reduces the amount of energy required to be provided by the belt alternator/starter system from the battery. Further, the vibration of the engine is reduced which leads to a reduction in the amplitude of the driver seat accelerometer signal 312 such that the vibration is barely, if at all, detectable. The method then continues to step 412 where the method waits a predetermined amount of time and continues to step 414 where the method stops.

In an exemplary embodiment, the method may be performed for a predetermined period of time before the start process continues. For example, the electric motor 134 of the turbocharger 102 may be operated to drive the turbine 108 for a period which is sufficient to account for the inertia of the air in the exhaust manifold and the combustion chamber such that the chamber pressure is reduced before engaging another motor, such as that in a belt alternator/starter system to initiate rotation in the engine and before fuel and spark is introduced.

In another exemplary embodiment, the intake valve 120 and the exhaust valve 128 may be controlled independently of each other and/or other components in the engine. For example, the intake valve 120 and exhaust valve may be operated using a two-step cam which may provide the ability to independently operate the valves.

Figure 5:
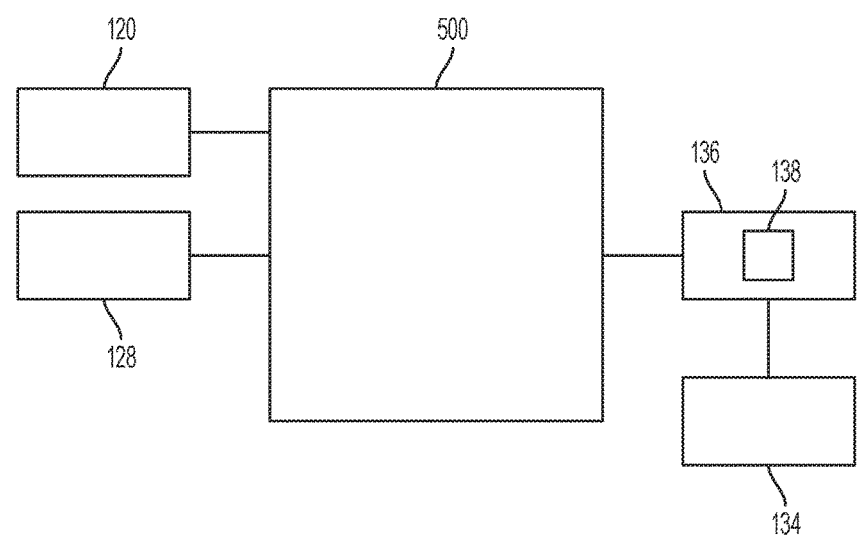
FIG. 5 is a schematic illustration of an exemplary controller 500 in accordance with the present invention.

FIG. 5 is a schematic illustration of an exemplary controller 500 in accordance with the present invention. The controller 500 is in communication with the intake valve 120 and the exhaust valve 128 to control operation of each of them. Further, the controller 500 is in communication with turbocharger electric motor controller 136 through which operation of the electric motor 134 of the turbocharger 102 may be operated. The controller 500 is configured to perform the method of FIG. 4.

Yet another benefit, in addition to the reduction in energy requirements and vibration, is the potential to reduce the overall time required to fully complete the start process. The reduction in combustion chamber pressures may reduce the amount of time that is required to fully accelerate the engine to a speed sufficient to introduce fuel and spark.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A vehicle propulsion system comprising:
    an internal combustion engine with a cylinder, an intake valve, an exhaust valve, and a cylinder head defining a combustion chamber;
    an intake manifold in communication with the combustion chamber through the intake valve;
    an exhaust manifold in communication with the combustion chamber through the exhaust valve;
    a turbocharger with a compressor in communication with the intake manifold, a turbine in communication with the exhaust manifold, and an electric motor for selectively driving the turbine; and
    a controller in communication with the electric motor and configured to selectively operate the electric motor to drive the turbine, close the intake valve, and open the exhaust valve, for a predetermined period of time before a belt alternator/starter system applies a force that initiates motion of a piston in the engine to reduce a pressure in the combustion chamber during an engine start process.

2. The system of claim 1, wherein the controller is configured to operate the electric motor for a predetermined period of time before a fuel is supplied to the combustion chamber.

3. The system of claim 1, wherein the controller is configured to operate the electric motor for a predetermined period of time before a spark is introduced into the combustion chamber.

4. The system of claim 1, further comprising a two-step cam controlling one of the intake valve and the exhaust valve.

5. A method for controlling a vehicle propulsion system that includes:
    an internal combustion engine with a cylinder, an intake valve, an exhaust valve, and a cylinder head defining a combustion chamber;
    an intake manifold in communication with the combustion chamber through the intake valve;
    an exhaust manifold in communication with the combustion chamber through the exhaust valve;
    a turbocharger with a compressor in communication with the intake manifold, a turbine in communication with the exhaust manifold, and an electric motor for selectively driving the turbine; and
    a controller in communication with the electric motor and configured to selectively operate the electric motor to drive the turbine, the method comprising selectively operating the electric motor to drive the turbine to reduce a pressure in the combustion chamber during the engine start process closing the intake valve, and opening the exhaust valve, for a predetermined period of time before a belt alternator/starter system applies a force that initiates motion of a piston in the engine to reduce a pressure in the combustion chamber during an engine start process.

6. The method of claim 5, wherein selectively operating the electric motor comprises operating the electric motor for a predetermined period of time before supplying fuel to the combustion chamber.

7. The method of claim 5, wherein selectively operating the electric motor comprises operating the electric motor for a predetermined period of time before introducing a spark into the combustion chamber.

* * * * *